UNITED STATES PATENT OFFICE.

ALBRECHT SCHMIDT AND ERNST BRYK, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

VAT DYE AND PROCESS OF MAKING.

959,617.  Specification of Letters Patent.  Patented May 31, 1910.

No Drawing.  Application filed August 14, 1909.  Serial No. 512,811.

*To all whom it may concern:*

Be it known that we, ALBRECHT SCHMIDT, Ph. D., and ERNST BRYK, Ph. D., citizens of the Empires of Germany and Austria-Hungary, respectively, residing at Höchst-on-the-Main, Germany, have invented certain new and useful Improvements in the Manufacture of Vat Dyestuffs, of which the following is a specification.

We have found that by reducing ortho-ortho-dinitrothioindigo and its substitution products, such as ortho-ortho-dinitro-para-para-dichlorothioindigoes, to the corresponding ortho-ortho-diaminothioindigoes, valuable vat-dyestuffs are obtained which dye cotton and wool in the hydro-sulfite vat fast bluish-gray to blackish-blue tints. Ortho-ortho-dinitrothioindigo and ortho-ortho-dinitro-para-para-dichlorothioindigo can be obtained from the ortho-nitrophenyl- and ortho-nitro-para-chlorophenylthioglycollic acid respectively by treating them with chlorosulfonic acid. The general formula of these products is:

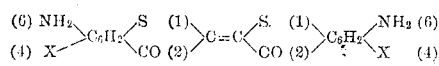

Example I: The ortho-ortho-dinitrothioindigo to be used as parent-material for the ortho-ortho-diaminothioindigo is obtained in the form of an orange brown powder by gradually introducing for instance 30 gr. of ortho-nitrophenylthioglycollic acid into 150 gr. of chlorosulfonic acid at about 15° while stirring, by continuing to stir for some time until a small quantity only of the parent-material is traceable, pouring the mixture on ice, filtering, boiling first with a diluted solution of carbonate of soda and then with water, and finally drying the mass. 20 gr. of this ortho-ortho-dinitrothioindigo or preferably a corresponding quantity of a paste of a certain degree of dryness are heated up to about 80° with a solution of 25 gr. of crystallized sodium sulfid in water, with or without addition of sulfur, while stirring for some hours. The paste thus obtained is filtered and well washed with hot water. The dry product forms a black powder which dissolves in concentrated sulfuric acid with an azure-blue color; on treatment with hydrosulfite it yields a vat which dyes wool and cotton steel-blue to blackish-blue tints. By treating this dyestuff with halogen, still faster tints can be obtained.

Example II: If in Example I, instead of 20 gr. of ortho-ortho-dinitrothioindigo, there are used 23 gr. of ortho-ortho-dinitro-para-para-dichlorothioindigo, which may be obtained in the form of a dark reddish-brown powder from the ortho-nitro-para-chlorophenylthioglycollic acid in a similar manner as the ortho-ortho-dinitrothioindigo, the ortho-ortho-diamino-para-para-dichloro-thioindigo is produced, in the form of a blackish-blue powder, soluble in sulfuric acid-monohydrate with a steel-blue color; on treatment with hydrosulfite it yields a vat which dyes wool and cotton steel-blue to blackish-blue tints. The formula of this product is:

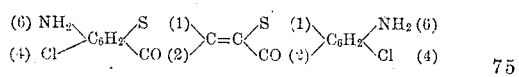

On reduction, the ortho-ortho-dinitro-para-para-dibromothioindigo obtainable from the ortho-nitro-para-bromophenylthioglycollic acid shows similar properties.

Instead of effecting the reduction by means of sodium sulfid, other known reducing agents may be employed for this purpose.

The new products are black to blackish-blue powders, insoluble in water, alcohol and diluted acids, and difficultly soluble in hot nitrobenzene with a violet-brown to violet color.

Having now particularly described our invention what we claim is:—

1. The process of manufacturing vat-dyestuffs, which consists in reducing ortho-ortho-dinitrothioindigo and the ortho-ortho-dinitro-para-para-dihalogenthioindigoes, substantially as above described.

2. As new products, the ortho-ortho-diaminothioindigoes of the general formula:

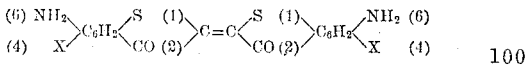

wherein X represents hydrogen or a halogen (Cl, Br), being black to blackish-blue powders, insoluble in water, alcohol, diluted alkalies and diluted acids, soluble in concentrated sulfuric acid with a blue color, difficultly soluble in hot nitrobenzene with a violet-brown to violet color, yielding on treatment with alkaline reducing agents, such as hydrosulfite, a vat from which wool and cotton are dyed dark-blue to blackish tints.

3. As a new product, the ortho-ortho-di-amino-para-para-dichlorothioindigo of the formula:

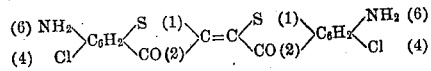

being a black to blackish-blue powder, insoluble in water, alcohol and diluted acids, soluble in sulfuric acid-monohydrate with a steel-blue color, very difficultly soluble in hot nitrobenzene with a dull violet-brown color, yielding on treatment with alkaline reducing agents, such as hydrosulfite, a vat from which wool and cotton are dyed steel-blue to blackish-blue tints.

In testimony whereof, we affix our signatures in presence of two witnesses.

ALBRECHT SCHMIDT.
ERNST BRYK.

Witnesses:
JEAN GRUND,
CARL GRUND.